Feb. 17, 1970  H. W. VAN AKEN, JR  3,495,610
FLOW DIVIDER
Filed Aug. 4, 1967  2 Sheets-Sheet 1
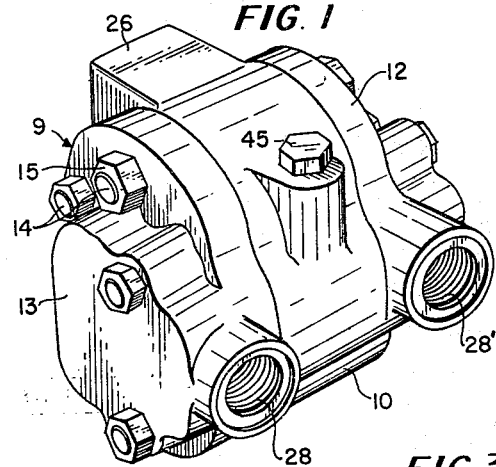
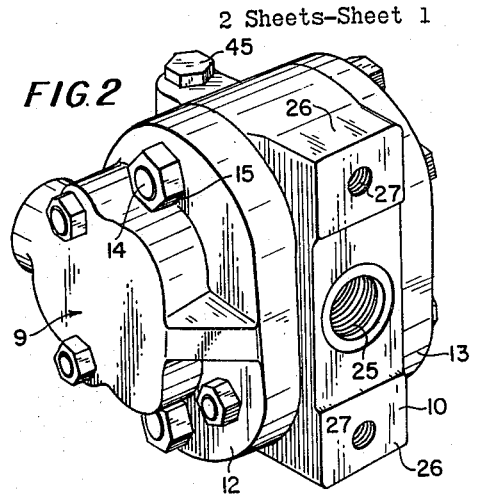
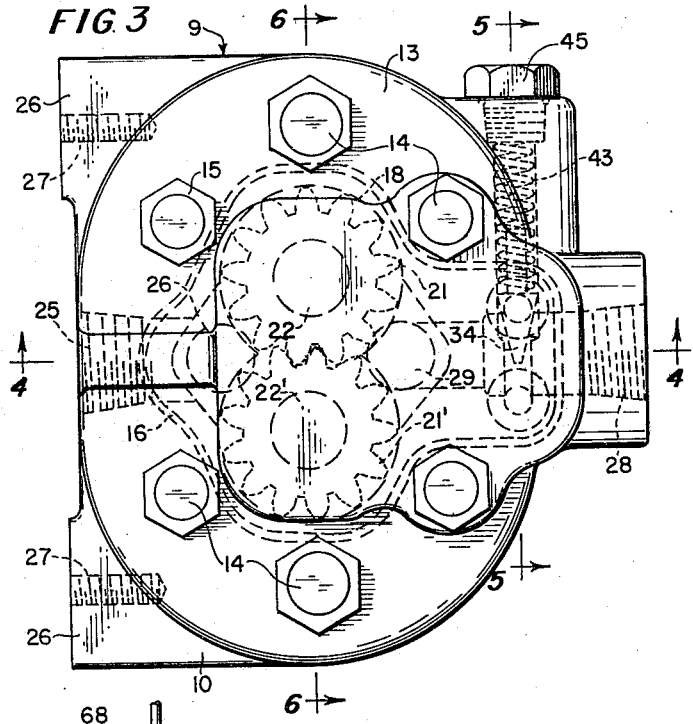
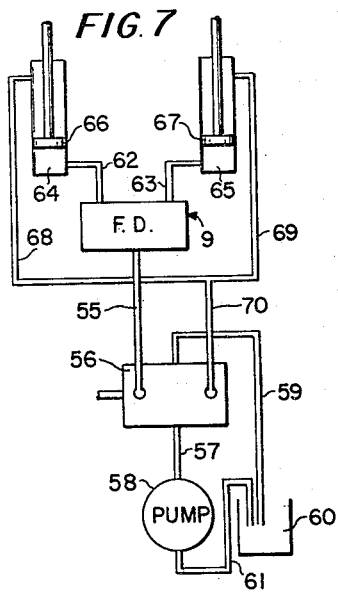
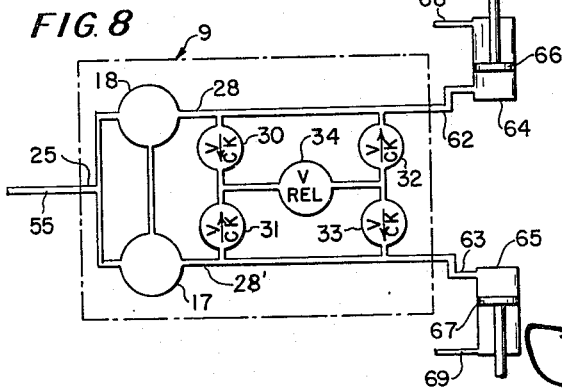
INVENTOR:
Harry W. Van Aken, Jr.

Feb. 17, 1970  H. W. VAN AKEN, JR  3,495,610

FLOW DIVIDER

Filed Aug. 4, 1967  2 Sheets-Sheet 2

INVENTOR:
Harry W. Van Aken, Jr.
Andrew F. Wintercorn
Atty.

United States Patent Office 3,495,610
Patented Feb. 17, 1970

1

3,495,610
FLOW DIVIDER
Harry W. Van Aken, Jr., Rockford, Ill., assignor, by mesne assignments, of one-fifth each to Harry W. Van Aken, Jr., John R. Lundin, Vincent F. Richardson, Alfred N. Moore, and Joel R. Jernberg, all of Rockford, Ill.
Filed Aug. 4, 1967, Ser. No. 658,373
Int. Cl. G05d *11/02;* F04b *13/02*
U.S. Cl. 137—99
6 Claims

ABSTRACT OF THE DISCLOSURE

This device is in the nature of two gear-type fluid motors coupled together in one unit, so there are two metering devices measuring the oil equivalent to the tooth volume of the gears. A single inlet port communicates with the two motors on one side of the gears and there are two outlet ports communicating separately with the two motors on the other side of the gears. The device meters in or out with equal accuracy. It also incorporates four check valves and a relief valve set at a pressure higher than the normal operating pressure. These valves are located between the two outlet ports, enabling porting of oil directly through the relief valve from one outlet port to the other, or vice versa, in the event one of two pistons that are being operated in timed relationship by oil delivered from the two outlet ports gets out of time with the other and that condition has to be corrected at the end of a stroke.

---

This invention relates to a flow divider designed to meter the flow of hydraulic fluid equally to two cylinders in order to keep the pistons operable under fluid pressure in said cylinders moving exactly alike regardless of any difference in loading, as for example, in lifts for plows, harrows, and disks, and in many other devices presenting a similar problem.

The flow divider itself consists of two gear type fluid motors that are coupled together on a common shaft thus becoming a metering device for metering the oil equivalent to the tooth volume of the gears. It has a single inlet port and two outlet ports and will function in either direction, thereby metering in or metering out.

The device also incorporates four check valves, and a relief valve set at a pressure higher than the normal system pressure, the seats for all these valves being preferably machined directly in the body and the side plates so that they pass oil through the relief valve directly from one outlet port to the other, or vice versa, in the event one piston gets out of time with the other and that has to be corrected at the end of the stroke.

The invention is illustrated in the accompanying drawings in which:

FIG. 1 is a perspective view of the flow divider showing the two outlet openings;

FIG. 2 is another perspective view from the opposite side showing the single inlet opening;

FIG. 3 is a side view;

FIG. 7 is a general hydraulic circuit diagram for the flow divider, and

FIG. 8 is a diagrammatic showing of the internal working parts of the flow divider itself to facilitate a better understanding of its operation.

The same reference numerals are applied to corresponding parts of the views.

2

Figure 4:
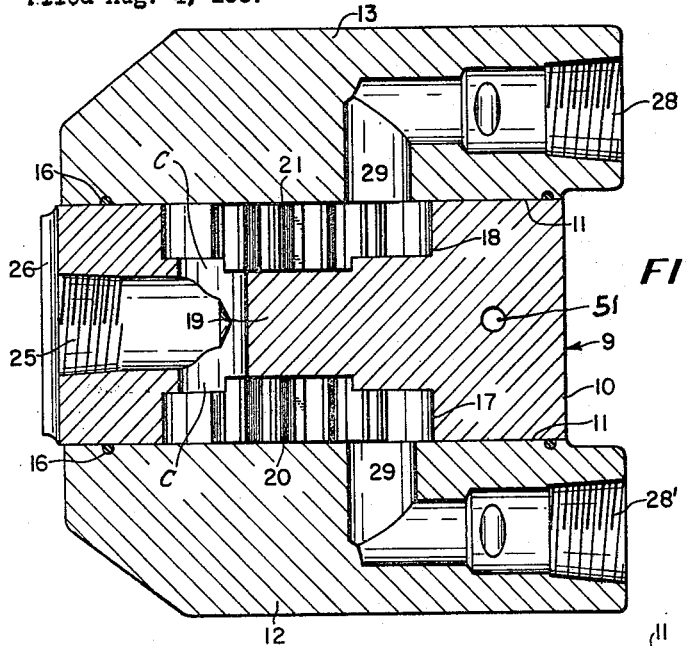
FIG. 4 is a longitudinal section on the line 4—4 of FIG. 3.
Figure 5:
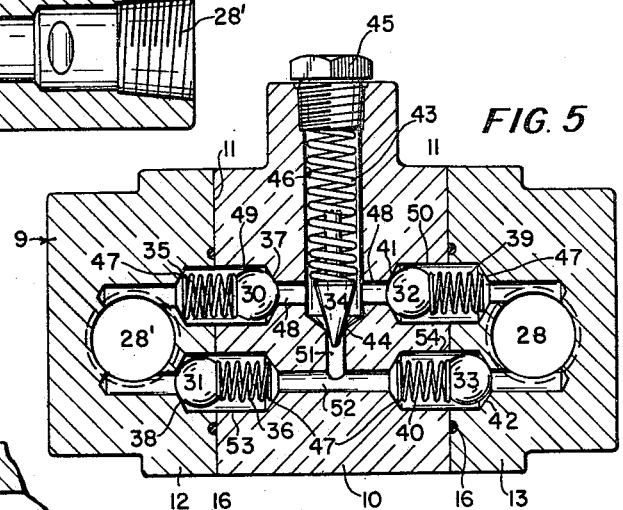
FIGS. 5 and 6 are cross-sections on the correspondingly numbered lines of FIG. 3.
Figure 6:
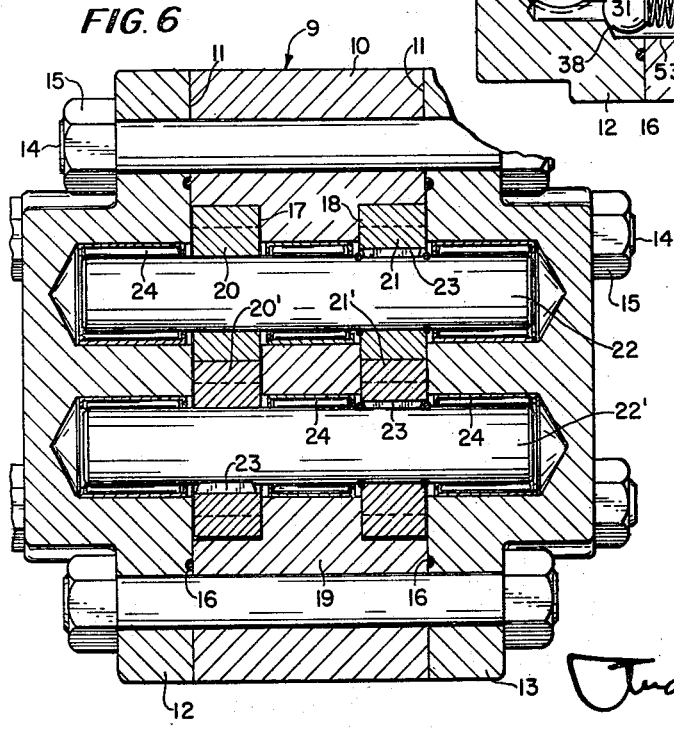

Referring to the drawings, the flow divider is indicated generally by the reference numeral 9 and comprises a central body 10 of generally oval form, as seen in FIG. 3, onto the opposed flat faces 11 of which side plates 12 and 13 are secured by bolts 14 and nuts 15, compressible sealing rings 16 projecting from grooves in the side plates serving to seal the two joints. Generally oval shaped recesses 17 and 18 are machined in opposite sides of the central body 10 on opposite sides of a middle wall 19 to serve as pump housings for the two gear type fluid motors that include the two pairs of intermeshing spur gears 20–20' and 21–21', which are coupled together by shafts 22 and 22' and keys 23. The two parallel shafts 22–22' operate in registering bearings in the middle wall 19 and side plates 12 and 13, as seen at 24. The single inlet port 25 has a cross-connection, as indicated at C at its inner end, with the two gear recesses 17 and 18 at one side of the pairs of intermeshing gears 20–20' and 21–21', this inlet port being in one side of the body 10 between two bosses 26 provided on the same side of the body 10 to permit rigid fastening of the flow divider on a suitable support using the screw threaded holes 27 provided in said bosses. The two outlet ports 28–28' have open communication at their inner ends, as seen at 29, with the recesses 17 and 18 on the diametrically opposite side from the inlet port 26. However, there is controlled cross-communication between the outlet ports 28 and 28' by virtue of the four check valves and a relief valve incorporated in the unit between these ports, as seen in FIG. 5, the seats for these valves being all preferably machined directly in the body 10 and the side plates 12 and 13 so that under certain conditions they pass oil directly through the relief valve from one outlet port to the other, or vice versa. The four check valves are numbered 30–33, and the relief valve 34. Springs 35 and 36 urge the check valves 30 and 31 in opposite directions toward seats 37 and 38, respectively. Springs 39 and 40 cooperate similarly with check valves 32 and 33, respectively, urging them toward seats 41 and 42, respectively. The relief valve 34 is of a tapered or conical form urged by a compression spring 43 into engagement with a seat 44. A plug 45 threaded in the outer end of the bore 46 provided in the body 10 for reception of the relief valve 34 and its spring 43 serves to back up the spring and seal the outer end of the bore. Seats for abutment by the springs 35, 36, 39 and 40 are provided, some in the side plates and some in the body 10, as shown at 47. Passages 48 opening from diametrically opposite sides of bore 46 are concentric with bores 49 and 50 in which check valves 30 and 32 are provided. Passage 51 at right angles to passages 48 connects the inner end of bore 46 with another passage 52 parallel to passages 48, the passage 52 being concentric with and connecting bores 53 and 54, in which check valves 31 and 33 are provided along with their operating springs. As shown, some of the bores 49, 50, 53 and 54 are provided in the body 10 and the remainder in side plates 12 and 13.

In operation, as seen in FIG. 7, the flow divider has the inlet line 55 connected to the linearly shiftable 4-way valve 56 to which fluid under pressure is continuously delivered through the line 57 from the pump 58, returning fluid being conducted through the return line 59 to the sump 60, from which the pump 58 is continuously pumping fluid through the intake line 61. The flow divider has its two outlet ports connected through lines 62 and 63 with one end of the cylinders 64 and 65, respectively, whereby in one position of valves 56 to give outward movement to the pistons 66 and 67 alike, due to the metering action of the flow divider 9, regardless of unequal loading of the pistons. Fluid is discharged from the other end of the cylinders 64 and 65 through return lines 68 and 69 to the valve 56 as indicated at 70, and thence to the sump 60 through line 59. In the event that one of the pistons 66–67 gets out of time with the other, and, of course, this could be only very slight, due to the close accuracy of division of flow through the flow divider, that condition is easily corrected at the end of the stroke by leaving the valve 66 in its given position. Then, since the piston that has already reached the end of the cylinder cannot move any further, pressure builds up enough in that cylinder in front of the piston to unseat the relief valve 34 and allow bypassing of fluid to the other cylinder until the piston in that cylinder has also come to the end of its stroke, whereupon the valve 66, which may be manually operable in some applications or operable semi-automatically or automatically in others, with manual control permissible whenever the operator so desires, is shifted to its other position for return movement of the two pistons in timed relationship to one another. In the return movement, the flow divider 9 again functions as a flow metering device to keep the pistons 66 and 67 moving in closely timed relationship to one another, due to the fact that the flow divider meters the flow in either direction with the same degree of close accuracy. Actual tests have shown that the accuracy is within one percent, in contrast to what was previously considered acceptable where the degree of runout was as much as 10 percent.

Referring now to FIGS. 5 and 8 for a better understanding of the operation of the flow divider itself, the two circles in FIG. 8 which are numbered 17 and 18 represent the two gear chambers in the body 10 of the flow divider 9, from which the outlet ports 28 and 28' deliver the fluid in evenly metered amounts. Assume, for example, that there is increased pressure in outlet 28' to line 63 by reason of piston 67 having gained on piston 66 to a small extent and reached the end of cylinder 65 before piston 66 reaches the end of cylinder 64. This increased pressure causes opening of check valve 33, and, inasmuch as check valve 31 will not permit flow from 33 past 31, the flow must occur through the relief valve 34 therebetween against the action of the return spring 43, and, since the fluid cannot flow through check valve 32, because that is held closed, being in communication with port 28', it can flow only through check valve 30, which communicates with port 28, thereby causing piston 66 to move independently of piston 67 to the end of cylinder 64. If there tends to be any increase in pressure at port 28 when the situation in respect to the pistons 66 and 67 is reversed, namely, that piston 66 is ahead of piston 67, it is apparent that when piston 66 comes to a halt at the end of cylinder 64, check valve 32 will permit flow through the relief valve 34 and check valve 31 in a similar way, thereby bringing the pistons back into timed relationship. The flow divider works the same way in reverse, to insure equal flow through ports 28 and 28' back to port 25, the valve 56 being shifted to its other position for fluid delivery from pump 58 through lines 68 and 69 to the other end of the cylinders 64 and 65. The pistons 66 and 67 remain in close step going down in the same way as going up.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. A flow divider comprising body means having two separate metering chambers in each of which is disposed a meshed pair of gears, there being a single inlet port provided in said body means communicating with both of said metering chambers on one side of said gears, said body means having two outlet ports communicating separately with the two chambers on the opposite side of said gears, means interconnecting two pairs of gears to turn together in unison, passages provided in said body means for establishing communication between the two outlet ports, an outwardly seating check valve and an inwardly seating check valve associated with each of said outlet ports in said passages permitting flow from either of said outlet ports to the other outlet port when the passages are open, and a relief valve controlling flow through said passages in either direction, the relief valve being set to open at a pressure higher than the normal operating pressure of the flow divider.

2. A flow divider comprising two gear type fluid motors coupled together, each measuring in either direction the liquid volume equivalent to the tooth volume of the gears, there being a single inlet line communicating with the two fluid motors, two separate outlet lines extending from the respective fluid motors, two cross-communication lines between the two outlet lines, an outwardly seating check valve and an inwardly seating check valve associated with each of these cross-lines permitting flow from either outlet line to the other when the cross-line is open, and a relief valve controlling flow through said cross-lines in either direction, said relief valve opening only at a pressure above the normal operating pressure of the flow divider.

3. In combination, a pair of substantially identical hydraulic cylinders in which like pistons are movable the full length of the bores of said cylinders in either direction at substantially the same lineal speed accordingly as fluid is supplied under pressure to one end of each of said cylinders and discharged at the other end, a flow divider comprising body means having two separate metering chambers in each of which is disposed a meshed pair of gears, there being a single inlet port provided in said body means communicating with both of said metering chambers on one side of said gears, said body means having two outlet ports communicating respectively with the two chambers on the opposite side of said gears and communicating respectively with one end of said cylinders, means interconnecting the two pairs of gears to turn together in unison, passages provided in said body means for establishing communication between the two outlet ports, an outwardly seating check valve and an inwardly seating check valve associated with each of said outlet ports in said passages permitting flow from either of said outlet ports of the other outlet port when the passages are open, a relief valve controlling flow through said passages in either direction, the relief valve being set to open at a pressure higher than the normal operating pressure of the flow divider as when one of said pistons reaches the end of its bore before the other piston, causing a build-up in pressure, a four-way valve connected on the one hand with the single inlet port of said flow divider and on the other hand with the other ends of said hydraulic cylinders to deliver fluid under pressure to the single inlet port to move the pistons in said cylinders in one direction while returning fluid from said cylinders to said four-way valve, a sump, a power operated pump pumping fluid from said sump under pressure to said four-way valve, and a return line from said four-way valve to said pump, said four-way valve in one of two positions causing piston movement in one direction with flow of fluid through the flow divider in a corresponding direction, and in the other of the two positions causing movement of the pistons in the reverse direction with corresponding fluid movement through the flow divider in the reverse direction.

4. In combination, a pair of substantially identical hydraulic cylinders in which like pistons are movable the full length of the bores of said cylinders in either direction at substantially the same lineal speed accordingly as fluid is supplied under pressure to one end of each of said cylinders and discharged at the other end, a flow divider comprising two gear-type fluid motors coupled together, each measuring in either direction the liquid volume equivalent to the tooth volume of the gears, there being a single inlet line communicating with the two fluid motors, two separate outlet lines extending from the respective motors to one end of the respective cylinders, two cross communication lines between the two outlet lines, an outwardly seating check valve and an inwardly seating check valve associated with each of these cross-lines permitting flow from either outlet line to the other when the cross-line is open, a relief valve controlling flow through said cross-lines in either direction, said relief valve opening only at a pressure above the normal operating pressure of the flow divider, as when one of said pistons reaches the end of its bore before the other piston, causing a build-up in pressure, a four-way valve connected on the one hand with the single inlet port of said flow divider and on the other hand with the other ends of said hydraulic cylinders to deliver fluid under pressure to the single inlet port to move the pistons in said cylinders in one direction while returning fluid from said cylinders to said four-way valve, a sump, a power operated pump pumping fluid from said sump to said four-way valve, and a return line from said four-way valve to said sump, said four-way valve in one of two positions causing piston movement in one direction with flow of fluid through the flow divider in a corresponding direction, and in the other of the two positions causing movement of the pistons in the reverse direction with corresponding fluid movement throught he flow divider in the reverse direction.

5. The combination set forth in claim 3 wherein the pistons are both movable in the same direction, both moving one way in one position of the four-way valve, and in the opposite direction in the other position of said valve.

6. The combination set forth in claim 4 wherein the pistons are both movable in the same direction, both moving one way in one position of the four-way valve, and in the opposite direction in the other position of said valve.

References Cited

UNITED STATES PATENTS

| 2,291,578 | 7/1942 | Johnson | 137—99 XR |
| 2,386,219 | 10/1945 | Lauck | 137—99 XR |
| 2,437,113 | 3/1948 | Montelius | 137—99 |
| 3,385,217 | 5/1968 | Bles | 137—99 XR |

HAROLD W. WEAKLEY, Primary Examiner

U.S. Cl. X.R.

103—6

UNITED STATES PATENT OFFICE
CERTIFICATE OF CORRECTION

Patent No. 3,495,610  February 17, 1970

Harry W. Van Aken, Jr.

It is certified that error appears in the above identified patent and that said Letters Patent are hereby corrected as shown below:

Column 4, line 60, "pump" should read -- sump --. Column 6, line 2, "he" should read -- the --.

Signed and sealed this 17th day of November 1970.

(SEAL)
Attest:

Edward M. Fletcher, Jr.
Attesting Officer

WILLIAM E. SCHUYLER, JR.
Commissioner of Patents